United States Patent

[11] 3,603,402

| [72] | Inventor | Robert McDonnell<br>P.O. Box 55, Ridge, N.Y. 11961 |
|---|---|---|
| [21] | Appl. No. | 808,817 |
| [22] | Filed | Mar. 20, 1969 |
| [45] | Patented | Sept. 7, 1971 |

[54] HORSESHOE AND METHODS FOR SHOEING A HORSE THEREWITH
9 Claims, 5 Drawing Figs.

[52] U.S. Cl. .................................................. 168/4, 168/12, 168/14
[51] Int. Cl. ....................................................... A01l 03/00, A01l 05/00, A01l 07/02
[50] Field of Search .......................................... 168/14, 4, 12; 260/47

[56] References Cited
UNITED STATES PATENTS

| 1,116,326 | 11/1914 | Powlowski et al. | 168/24 X |
| 1,946,636 | 2/1934 | Nygaard | 168/4 |
| 3,050,133 | 8/1962 | Ketner et al. | 168/4 |
| 3,302,723 | 2/1967 | Renkenberger et al. | 168/4 |
| 3,310,115 | 3/1967 | Ward | 168/4 |
| 3,470,960 | 10/1969 | Massone | 168/4 |
| 3,490,536 | 1/1970 | Hourlier | 168/4 |
| 3,494,422 | 2/1970 | Clark | 168/4 |

OTHER REFERENCES
Reinhold Plastics Application Series, " Polycarbonates," pages 75– 79.
The Condensed Chemical Dictionary, Sixth Edition, page 910.

Primary Examiner—Aldrich F. Medbery
Attorney—Victor M. Helfand

ABSTRACT: A horseshoe molded of a high impact polycarbonate resin attachable to a hoof either by nails through preformed openings in the horseshoe, or by a high impact polycarbonate resin cement. For the latter purpose, the horseshoe is formed with a groove on each of its side faces adjacent its hoof-contacting face for receiving and guiding a cutting nippers for severing the shoe from the hoof. The horseshoe may be provided with partially overlapping bars extending from each end thereof, at its opening, one of said bars having spaced holes formed therein and the other of said bars having a pin projecting therefrom engageable in a selected one of the holes.

PATENTED SEP 7 1971

3,603,402

INVENTOR.
Robert McDonnell
BY
ATTORNEY

HORSESHOE AND METHODS FOR SHOEING A HORSE THEREWITH

The present invention relates to horseshoes and to methods for attaching and removing the same from the hooves of a horse.

The most advantageous type of horseshoe particularly for racing horses, must be lightweight and must give by slight spreading, under impact of the horse's foot on the ground, so as to conform to the slight spreading of the horse's hoof itself, that takes place on such impact. It is also essential that the horseshoe is completely and safely secured on the hoof so as to stay on and avoid damage on injury to the horse's foot.

The present invention is directed to the provision of horseshoes that possess all of the foregoing advantages; namely, are of light weight yet strong and sturdy as well as comfortable by being slightly resilient and compressible against the horse's hoof and expandable to conform to the expansion of the hoof under running impact, and may be safely and securely secured to the horse's hoof.

The present invention is also directed to the provision of horseshoes having the additional advantages of being transparent to make the overlying portions of the hoof visible during the shoeing operating, as well as for inspection thereafter.

It is another object of the present invention to provide horseshoes of the character described, that may be cold-formed by pressure to fit any horse's hoof, regardless of its individual shape.

It is a further object of the present invention to provide horseshoes of the character described, which may be attached to a horse's hoof without the use of nails and may also be readily removed from the hoof for replacement, as often as may be necessary, without splitting or causing any other damage to the hoof during either of these operations.

The foregoing and other objects and advantages of the horseshoes of the present invention and the methods for their attachment to and removal from a hoof will become apparent to those skilled in the art from the several embodiments thereof shown in the accompanying drawing and from the description following. It is to be understood however, that such embodiments are shown by way of illustration only, to make the principles and practice of the invention more readily comprehensible and without any intent of limiting the invention to the specific details therein shown.

Generally stated, the invention resides in forming the horseshoe of a lightweight, high impact resin such as a polycarbonate resin, one of which is available on the market under the trade name of "Lexan". Such polycarbonate resin may be readily molded into the desired horseshoe shape, with preformed nail holes, if desired, and, in its molded state, has high impact strength, a slight inherent resilience, and is resistant to heat such as might be generated during the running of a race by the heavy and frequent impacts against the track, and which may be admixed with the glass fibers to provide strength and rigidity approximating those of metals. Such high impact polycarbonate resin, whether in pure form or in admixture with glass fibers, may be readily adhesively secured to a horse's hoof by a cement formed of its own material or similar material, and said adhesion is sufficiently strong to withstand the rapid and heavy impact generated by a racing horse.

Figure 1:
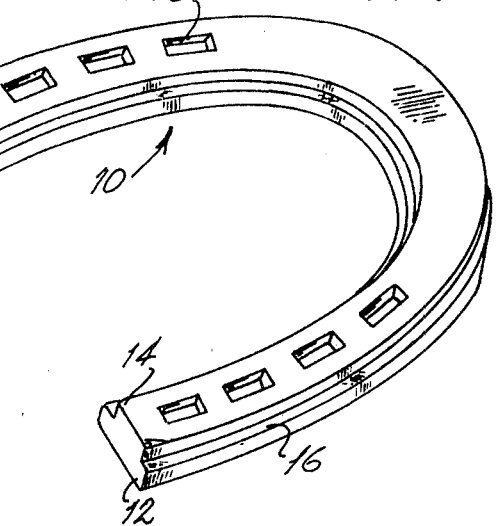
FIG. 1 is a perspective view of one embodiment of a horseshoe of the present invention.
Figure 5:
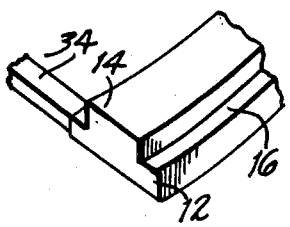
FIG. 5 is a fragmentary, perspective view of yet another modified embodiment of a horseshoe of the invention, in which a feature of the embodiment of FIG. 3 is combined with the structure of FIG. 1.

Referring now in greater detail to the embodiments of the invention illustrated in the drawings and with particular reference to the embodiment illustrated in FIG. 1 thereof, the horseshoe, generally designated as 10, is of conventional outline adapted to fit about the marginal portion of the underside of a horse's hoof. The horseshoe 10 is formed of a preferably transparent high impact polycarbonate resin, such as commercially available under the trade name "Lexan" with or without the admixture of glass fibers. The horseshoe 10 is shown to comprise a bottom or ground-contacting portion, 12, of conventional width or wider, and a top of hoof-contacting portion, 14, which is of relatively narrower width and offset inwardly from the inner and outer edges of the bottom portion 12, to provide grooves or recesses 16, on the inner and outer sides of the shoe, whose purpose will be hereinafter explained.

While the horseshoe 10 may be provided with the preformed nail-passage openings, 18, as is conventional, for attaching to the hoof, by nails in the conventional manner, I prefer to have the horseshoe 10 attached to the hoof by a synthetic resin cement, preferably formed of the same high impact polycarbonate synthetic resin as the horseshoe, which resin may be dissolved in a volatile solvent of any type suitable for the purpose. I have found that a cement, such as a polycarbonate synthetic resin cement is highly adequate to attach the horseshoe, by its upper surface, to the underside of the hoof, making a firm and secure bond that will not loosen even under the successive heavy impacts against the ground made by the hooves of a racing horse.

I have found that a horseshoe, such as 10, made so and so attached by a synthetic resin cement, has a slight resilient inherent in it to accommodate itself to the spread of the horse's hoof under impact with the ground, without breaking or disturbing the cement bond.

A horseshoe, such as 10, is readily removable from the hoof, for replacement or substitution for a new horseshoe, Such removal may be effected by snipping with a horseshoer's nippers, which will readily be cut through the upper, narrower horseshoe section 14. The edges of the nippers will readily engage and fit in the groove 16, to be guided thereby and initiated from either slipping off the horseshoe, or upwardly to engage and harm the underside of the hoof. Any remnants of the horseshoe remaining attached to the hoof bottom after the main portion thereof is cut away by the clippers may be readily removed from the hoof by filing away, likewise without any damage to the hoof.

It will be clear from the foregoing that a horseshoe such as 10 may be economically mass-produced by molding, and may be attached to a horse's hoof without the conventional use of nails and the tools required for such use; nor the labor required by the operator, nor the discomfort to the horse, nor damage and possible injury to its hooves.

Figure 2:
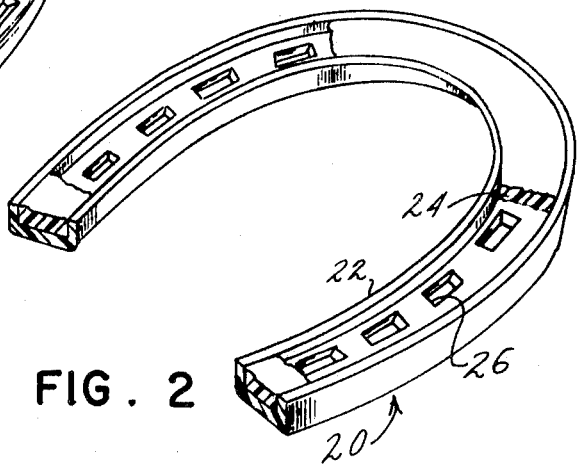
FIG. 2 is a similar view of another embodiment of a horseshoe of the present invention.

FIG. 2 illustrates another embodiment of a horseshoe of the present invention, which is generally designated as 20, and is likewise molded of a high impact polycarbonate resin. Horseshoe 20 is formed with upright flanges, 22, at its inner and outer top edges between which may be disposed a layer 24, of a relatively softer synthetic resin that will form a cushion between the horseshoe 20 and the hoof to which it is attached, in the conventional manner, by means of nails passed through the openings, 26, provided for the purpose.

Figure 3:
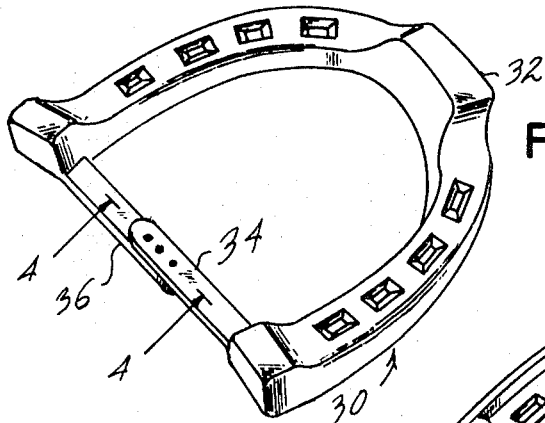
FIG. 3 is a perspective view of still another embodiment of a horseshoe of the present invention.
Figure 4:
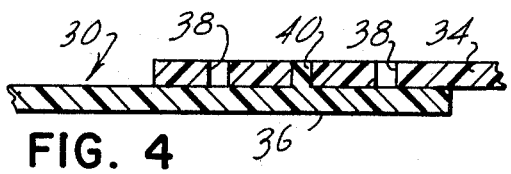
FIG. 4 is an enlarged section taken on line 4—4 of FIG. 3

FIGS. 3 and 4 illustrate a further modified embodiment of the invention in which the polycarbonate resin horseshoe 30, is of generally uniform cross section and is provided on its underside with ground-gripping elements such as the cleats 32. Horseshoe 30 is also provided with means adjusting the width of the openings between the ends of the sides; such means consisting of integrally formed bars, 34 and 36 extending from the horseshoe ends, inwardly towards one another in overlapping position. One of the bars, as 34, which overlies the other bar 36, is provided with a plurality of spaced openings 38, and the other of which, such as 36, is provided with at least one upwardly projecting pin 40, which may be passed into a selected one of the openings 38 to widen or narrow the space between the ends of the horseshoe 30 to conform to a hoof which is wider or narrower at its inner end.

It may here be stated that when the term "high impact" is used in the specification and claims, it is intended to describe a resin which, when molded, is rigid and resilient to sudden application of great force or heavy blows, such as experienced upon the stroking of the hoof of a running horse upon the ground and will not shatter nor appreciably put out of shape nor become permanently deformed under such force or blow.

This completes the description of the several embodiments of the horseshoe of the present invention and of a method for attaching them on a hoof. It may here be stated that the features of the several embodiments illustrated and described are nonexclusive and that all or some of them may be incorporated into a single embodiment. Thus, for instance, the cleats 32 and/or bars 34 and 36 may be readily provided on each of the horseshoes 10 and 20. Likewise, flanges 22 and insert cushion-layer 24 may be provided on horseshoes 30, and horseshoe 30 may be provided with grooves 16 and cemented in place in a manner as described with reference to the horseshoe 10.

It will also be apparent that numerous other modifications and variations may be made in the horseshoe of the present invention by anyone skilled in the art, in accordance with the principles of the invention hereinabove set forth, without any exercising of any inventive ingenuity.

What I claim is:

1. A horseshoe comprising a horseshoe shaped body molded of a high impact synthetic polycarbonate resin, said body having an upper portion of lesser width than the lower portion thereof, said upper portion being offset from each side edge of said body to form a rabbitlike recess around the horseshoe at each side thereof, said recess providing means for receiving and guiding the edges of a cutting tool for severing the horseshoe from a hoof to which it is attached.

2. The horseshoe of claim 1, wherein means are provided for adjusting the width of the openings between the ends of said body, said means comprising a bar extending inwardly from each end of said body, in overlapping relation to one another, one of said bars having a plurality of spaced openings formed therein and the other of said bars having a pin provided thereon adapted to engage in a selected one of said openings in said one bar.

3. The horseshoe of claim 1, wherein said polycarbonate resin forming said body is reinforced with an admixture of glass fibers.

4. The horseshoe of claim 1, wherein said body is molded with horseshoe nail openings preformed therein.

5. The horseshoe of claim 4, wherein upright flanges are provided along the entire length of each bottom edge of said body, forming a recess, and a yieldable synthetic resin cushion is secured within said recess.

6. The method for shoeing a horse comprising the steps of molding a horseshoe from a high impact synthetic polycarbonate resin while forming a groove in the inner and outer sides of said horseshoe adjacent the hoof-contacting surface thereof, said grooves providing means for removing the shoe while inserting and guiding the edges of a cutting tool into said groove and severing said horseshoe from the hoof, forming a synthetic resin cement adherable to said horseshoe and the underside of a horses' hoof and cementing said horseshoe to the underside of said hoof with said cement.

7. The method of claim 6, wherein said cement comprises a high impact polycarbonate resin dissolved in a volatile solvent.

8. The method of claim 6, which includes the step of removing a prior cemented polycarbonate resin horseshoe from a hoof to be shod by cutting the same with cutting nippers and grinding away remnants of said removed horseshoe with an abrading tool.

9. The method of custom-forming a horseshoe to fit a horse's hoof of a specific contour, shape and size, comprising the steps of molding said horseshoe of a polycarbonate resin into a standard horseshoe shape having continuous, uninterrupted peripheral edges, thereafter placing said molded horseshoe against the underside of a specific hoof of the horse to which the shoe is to be fitted, determining the differences in contour, shape and size between said horseshoe and the hoof against which it is fitted, and thereafter applying pressure to cold-form the shoe to eliminate the differences in contour shape and size between said horseshoe and said hoof, to thereby conform the horseshoe to said specific hoof so that the horseshoe will fit said hoof when attached thereto.